United States Patent
Koyama et al.

(10) Patent No.: US 8,673,066 B2
(45) Date of Patent: Mar. 18, 2014

(54) DUST-REMOVING METHOD

(75) Inventors: Yoshinori Koyama, Tokyo (JP); Osamu Shinada, Tokyo (JP); Yuichiro Kitagawa, Tokyo (JP); Takashi Yamamoto, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/390,161

(22) PCT Filed: Jul. 15, 2010

(86) PCT No.: PCT/JP2010/061943
§ 371 (c)(1),
(2), (4) Date: Feb. 13, 2012

(87) PCT Pub. No.: WO2011/040109
PCT Pub. Date: Apr. 7, 2011

(65) Prior Publication Data
US 2012/0137890 A1    Jun. 7, 2012

(30) Foreign Application Priority Data
Sep. 30, 2009   (JP) ................. 2009-228590

(51) Int. Cl.
*B01D 46/04*  (2006.01)
(52) U.S. Cl.
USPC ............ 95/280; 96/421; 96/427; 96/428; 55/283; 55/302
(58) Field of Classification Search
USPC .......... 55/361–382, 292–294, 301–303, 282, 55/341.1–341.7; 95/278–282, 273; 96/233, 421, 424, 427, 428
See application file for complete search history.

(56) References Cited

U.S. PATENT DOCUMENTS

| | | | |
|---|---|---|---|
| 4,445,912 A | 5/1984 | Volk et al. | |
| 4,492,003 A * | 1/1985 | Boylan | 15/406 |

(Continued)

FOREIGN PATENT DOCUMENTS

| | | |
|---|---|---|
| DE | 25 29 464 | 1/1977 |
| EP | 0 325 176 | 7/1989 |

(Continued)

OTHER PUBLICATIONS

International Search Report issued Nov. 2, 2010 in corresponding International Application No. PCT/JP2010/061943.

(Continued)

*Primary Examiner* — Duane Smith
*Assistant Examiner* — Thomas McKenzie
(74) *Attorney, Agent, or Firm* — Wenderoth, Lind & Ponack, LLP

(57) ABSTRACT

In a porous filter, dust that has been collected from a gas through a filter group installed in a vessel body onto filter surfaces is removed from the filter surfaces by backwashing in which the supply and stoppage of a high-pressure gas ejected toward porous filter elements are repeated by means of a valve operation. Backwash tanks having upstream backwash valves and downstream backwash valves are installed in backwash pipes through which the high-pressure gas is guided from high-pressure-gas supply equipment to backwash nozzles for ejecting the backwash high-pressure gas toward the filter group to form a backwash high-pressure-medium supply line. The outlet pressure of the high-pressure-gas supply equipment is set to "1/critical pressure ratio" or more times a filter inlet gas pressure so that the flow speed of the high-pressure gas ejected from the backwash nozzle is the speed of sound or higher.

7 Claims, 7 Drawing Sheets

(56) References Cited

U.S. PATENT DOCUMENTS

| | | | |
|---|---|---|---|
| 4,867,769 A * | 9/1989 | Oda et al. | 55/302 |
| 5,242,472 A * | 9/1993 | Sellakumar | 95/280 |
| 5,616,171 A * | 4/1997 | Barris et al. | 95/280 |
| 6,641,646 B2 | 11/2003 | Rosenberg | |
| 7,422,626 B2 | 9/2008 | Feugier | |
| 2003/0047075 A1* | 3/2003 | Horton et al. | 95/280 |
| 2004/0060578 A1 | 4/2004 | Feugier | |
| 2007/0199593 A1* | 8/2007 | Mends et al. | 137/1 |
| 2008/0044296 A1* | 2/2008 | Wood et al. | 417/234 |

FOREIGN PATENT DOCUMENTS

| | | |
|---|---|---|
| JP | 6-91123 | 4/1994 |
| JP | 6-190229 | 7/1994 |
| JP | 8-155235 | 6/1996 |
| JP | 3128261 | 11/2000 |
| JP | 2002-241770 | 8/2002 |
| JP | 2004-525052 | 8/2004 |
| JP | 2007-90222 | 4/2007 |
| JP | 2009-113014 | 5/2009 |
| RU | 2257940 | 8/2005 |
| RU | 2355464 | 5/2009 |
| SU | 1777933 | 11/1992 |

OTHER PUBLICATIONS

European Search Report issued Mar. 6, 2013 in corresponding European Patent Application No. 108202292.2.

Decision to Grant issued Jun. 13, 2013, in Russian Patent Application No. 2012105037 (with English translation).

* cited by examiner

DUST-REMOVING METHOD

BACKGROUND OF THE INVENTION

I. Technical Field

The present invention relates to dust-removing apparatuses applied to, for example, integrated gasification combined cycle (IGCC) facilities and pressurized fluidized-bed combustion (PFBC) combined cycle facilities, particularly, to a dust-removing apparatus that repeats a backwash operation, in which a high-pressure medium is supplied and stopped, with high frequency and that controls the operation with valves.

II. Description of the Related Art

As a system for removing dust from a dust-containing gas, for example, a candle-type porous filter system is known in the related art. This porous filter system collects and removes dust from gas passing through porous filter elements. Therefore, as caked dust collected on the filter surfaces of the porous filter elements grows, it increases the flow resistance, thus raising the differential pressure of the porous filter elements (filter differential pressure).

To decrease the differential pressure of the porous filter elements for continuous operation of the system, therefore, a backwash system needs to be operated in which backwashing is performed by blowing a high-pressure gas into the outlets of the porous filter elements to release and remove dust deposited on the surfaces of the porous filter elements.

In a known example of a porous filter system shown in FIG. 7, reference sign 10 in the figure is a porous filter (dust-removing apparatus), reference sign 12 is a vessel body, reference sign 14 is a porous filter element, reference sign 16 is a filter tube sheet, reference sign 18 is a dust-containing-gas introduction pipe, reference sign 20 is a clean gas outlet, and reference sign 22 is a dust discharge outlet. This porous filter 10 is configured such that a dust-containing gas is introduced from the dust-containing-gas introduction pipe 18 into the vessel body 12, passes through the porous filter elements 14, which are provided in large numbers, and flows out of the vessel from the clean gas outlet 20. As the dust-containing gas passes through the porous filter elements 14, therefore, the dust, being composed of particles, is separated from the gas without being able to pass through the porous filter elements 14 and is deposited and collected on the filter surfaces of the porous filter elements 14.

In addition, a backwash system for releasing and removing caked dust deposited and grown on the filter surfaces of the porous filter elements 14 is configured to blow a high-pressure gas into backwash nozzles 34 through a main backwash pipe 31 connected to high-pressure-gas supply equipment 30 such as a compressor. That is, the backwash system for the porous filter 10 can blow a high-pressure gas into the outlets of the porous filter elements 14 (clean gas outlets) in a direction opposite to the flow direction of the dust-containing gas to release and remove caked dust deposited on the filter surfaces by means of the flow of high-pressure gas.

In the example structure shown, for continuous operation within a process, the filter group, composed of the large number of porous filter elements 14 installed in the vessel body 12, is divided into a plurality of (in the example shown, four) cleaning areas, and four backwash pipes 32a, 32b, 32c, and 32d branched off from and independent of the main backwash pipe 31 are provided for the respective groups of the cleaning areas. The backwash pipes 32a, 32b, 32c, and 32d have backwash valves 36a, 36b, 36c, and 36d, respectively.

The opening/closing operation of the backwash valves 36a, 36b, 36c, and 36d is managed such that regular backwashing is executed for each group or for each set of several separate groups so that the flow of the dust-containing gas through the vessel body 12 of the porous filter 10 shows less variation. The backwash pipes 32a, 32b, 32c, and 32d and the backwash valves 36a, 36b, 36c, and 36d are collectively referred to as backwash pipes 32 and backwash valves 36, respectively, unless the cleaning areas need to be distinguished.

As a known backwash apparatus using compressed gas, on the other hand, one composed of a compressed gas source and a gas reservoir space having valves on the upstream and downstream sides thereof is disclosed in Publication of Japanese Patent No. 3128261 below. This backwash apparatus is configured such that a high-response-speed valve is used as the downstream valve to remove all dust deposited on ceramic filter tubes with a short pulse.

Publication of Japanese Patent No. 3128261

SUMMARY OF INVENTION

A system that regularly supplies a backwash high-pressure gas to perform backwashing, as in the known porous filter system described above, needs to operate the backwash valves, which are opened and closed for supplying the high-pressure gas, at high speed (the time for actuation from a closed state to an open state or from an open state to a closed state is about 0.1 to 0.2 seconds) to reduce the amount of high-pressure gas supplied to the porous filter elements.

In addition, the backwash valves of the above backwash system generally operate every several minutes to switch between supplying and stopping the high-pressure gas.

The time during which the high-pressure gas is supplied (the operating time of the backwash valves from opening until closing) is several seconds (five seconds or less, preferably one second or less); therefore, an extremely high rotational (opening/closing) speed is required for the type of backwash valve that is opened and closed by rotating a valve element through 90°.

Consequently, the backwash valves are opened and closed at a high frequency (several tens of thousands to hundreds of thousands of times per year) and a high speed (the time from a closed state to a closed state again, via an open state, is about 0.2 to several seconds), which makes ensuring reliability an important challenge.

If the backwash valves fail, the porous filter elements cannot be backwashed in some cleaning areas, possibly leading to an increased pressure loss in the porous filter system or a limited amount of dust-containing gas being processed (limited plant load due to the limited amount of dust-containing gas being processed by the dust-removing apparatus).

Against this backdrop, there is a demand for an improvement in the durability and operating reliability of a dust-removing apparatus having a filter element backwash system using a high-pressure gas with improved operating conditions for backwash valves, which are opened and closed with high frequency.

An object of the present invention, which has been made in light of the above circumstances, is to provide a dust-removing apparatus having a backwash system using a high-pressure gas with improved durability and operating reliability by improving operating conditions, such as the frequency at which backwash valves are opened and closed.

To solve the above problem, the present invention employs the following solutions.

A dust-removing apparatus according to the present invention is a dust-removing apparatus in which dust that has been collected from a gas through a filter group installed in a vessel body onto filter surfaces is removed from the filter surfaces by backwashing in which the supply and stoppage of a backwash high-pressure medium ejected toward the filters are repeated by means of a valve operation; a high-pressure-medium pressure accumulator tank having an upstream backwash valve and a downstream backwash valve is installed in a high-pressure-medium passage through which the backwash high-pressure medium is guided from a high-pressure-medium source to a backwash nozzle for ejecting the backwash high-pressure medium toward the filter group to form a backwash high-pressure-medium supply line; and the outlet pressure of the high-pressure-medium source is set to "1/critical pressure ratio" or more times a filter inlet gas pressure so that the flow speed of the high-pressure medium ejected from the backwash nozzle is the speed of sound or higher.

In this dust-removing apparatus, because the high-pressure-medium pressure accumulator tank having the upstream backwash valve and the downstream backwash valve is installed in the high-pressure-medium passage through which the backwash high-pressure medium is guided from the high-pressure-medium source to the backwash nozzle for ejecting the backwash high-pressure medium toward the filter group to form the backwash high-pressure-medium supply line, and because the outlet pressure of the high-pressure-medium source is set to "1/critical pressure ratio" or more times the filter inlet gas pressure so that the flow speed of the high-pressure medium ejected from the backwash nozzle is the speed of sound or higher, the backwash high-pressure medium stored in the high-pressure-medium pressure accumulator tank, serving as a buffer tank, maintains the outlet pressure of the backwash nozzle at a high pressure without opening and closing the downstream backwash valve at high speed, that is, without using a high-speed-operated valve for the downstream backwash valve, thus allowing reliable backwashing.

In addition, if the upstream backwash valve is closed during backwashing, the high-pressure gas is not supplied to the backwash nozzle in an amount exceeding the capacity of the high-pressure-medium pressure accumulator tank even if the opening/closing operation of the downstream backwash valve is slow.

In the above invention, preferably, a high-pressure-medium storage tank is installed at an outlet of the high-pressure-medium source, which reduces the pressure variation of the backwash high-pressure medium to stabilize the pressure of the backwash high-pressure medium charged into the high-pressure-medium pressure accumulator tank.

It is desirable to provide a control valve that operates depending on the inner pressure of the high-pressure-medium storage tank on the high-pressure-medium source side of the high-pressure-medium storage tank.

In the above invention, preferably, the backwash high-pressure-medium supply line branches into a plurality of high-pressure-medium branch supply lines downstream of the high-pressure-medium source, and the high-pressure-medium branch supply lines are assigned to a plurality of cleaning areas into which the filter group is divided, which reduces the amount of backwash high-pressure medium required per backwash operation, thus making it easy to use a low-speed-operated valve for the downstream backwash valve together with a relatively low-capacity high-pressure-medium pressure accumulator tank.

In the above invention, preferably, a backwash opening/closing procedure of the upstream and downstream backwash valves includes a backwash-preparing procedure composed of a high-pressure-medium charging procedure of closing the downstream backwash valve and opening the upstream backwash valve to charge the backwash high-pressure medium into the high-pressure-medium pressure accumulator tank to a predetermined pressure, thereby raising the pressure therein, and a pressure-maintaining procedure of closing the upstream backwash valve to maintain the pressure in the high-pressure-medium pressure accumulator tank at the predetermined pressure; and a sequential backwash procedure composed of a backwash-executing procedure of opening the downstream backwash valve for a predetermined period of time to supply the backwash high-pressure medium from the high-pressure-medium pressure accumulator tank to the backwash nozzle, a high-pressure-medium recharging procedure of closing the downstream backwash valve and opening the upstream backwash valve to recharge the backwash high-pressure medium into the high-pressure-medium pressure accumulator tank to the predetermined pressure, thereby raising the pressure therein, and a recharged-pressure maintaining procedure of closing the upstream backwash valve to maintain the recharged pressure in the high-pressure-medium pressure accumulator tank at the predetermined pressure, and the backwash procedure is sequentially carried out once completion of the backwash operation has been confirmed for each of the plurality of cleaning areas.

With this procedure, upon completion of the backwash-preparing procedure, which charges the backwash high-pressure medium into the high-pressure-medium pressure accumulator tank to a predetermined pressure, thereby raising the pressure therein, and which closes the upstream backwash valve to maintain the pressure in the high-pressure-medium pressure accumulator tank at the predetermined pressure, the plurality of separate cleaning areas can be sequentially backwashed one after another by supplying the backwash high-pressure medium from the high-pressure-medium pressure accumulator tank to the backwash nozzle. In addition, upon completion of backwashing, the backwash high-pressure medium can be recharged into the high-pressure-medium pressure accumulator tank to prepare for the next backwashing while another cleaning area is being backwashed.

In the above invention, preferably, the completion of the backwash operation for each of the cleaning areas is determined based on the output of a sequence instruction to the upstream and downstream backwash valves, which allows backwashing to be sequentially continued in the next cleaning area without being stopped because the completion of backwashing is assumed even if the valves malfunction and stop halfway.

In the above invention, preferably, a pressure gauge is installed on the high-pressure-medium pressure accumulator tank to detect a pressure accumulator tank inner pressure, and the pressure accumulator tank inner pressure is used as a basis for determining the timing at which the upstream backwash valve is closed in the pressure-maintaining procedure and the timing at which the downstream backwash valve is closed in the high-pressure-medium recharging procedure, which facilitates control for setting the pressure of the high-pressure-medium pressure accumulator tank to a pressure best suited to backwashing.

In the above invention, preferably, a differential pressure gauge for detecting the differential pressure of the filter group is installed on the vessel body, which allows the filter differential pressure to be maintained within an appropriate range by appropriately changing the backwash pressure and cycle time depending on changes in filter differential pressure.

In the dust-removing apparatus of the present invention described above, the high-pressure-medium pressure accumulator tank, serving as a buffer tank, is installed to allow the use of low-speed-operated valves for the backwash operation. The use of low-speed-operated valves for the backwash operation improves the operating conditions of the backwash valves, thus providing a remarkable improvement in the durability of the backwash valves and consequently improving the operating reliability of the dust-removing apparatus.

In addition, in the event of a malfunction in the backwash valves, the amount of backwash high-pressure medium supplied to the filter group of the dust-removing apparatus is limited by the capacity of the high-pressure-medium pressure accumulator tank because the upstream backwash valve of the high-pressure-medium pressure accumulator tank is closed. In the dust-removing apparatus, therefore, the flow rate of the backwash high-pressure medium, which contributes to a disturbance in the flow of the dust-containing gas, is reduced, which allows dust removal to be continued with a less-varying, more-stable flow, thus improving the operating stability of the dust-removing apparatus and therefore of a plant equipped with the dust-removing apparatus.

DETAILED DESCRIPTION OF THE INVENTION

An embodiment of a dust-removing apparatus according to the present invention will be described below based on the drawings.

First Embodiment

Figure 1:
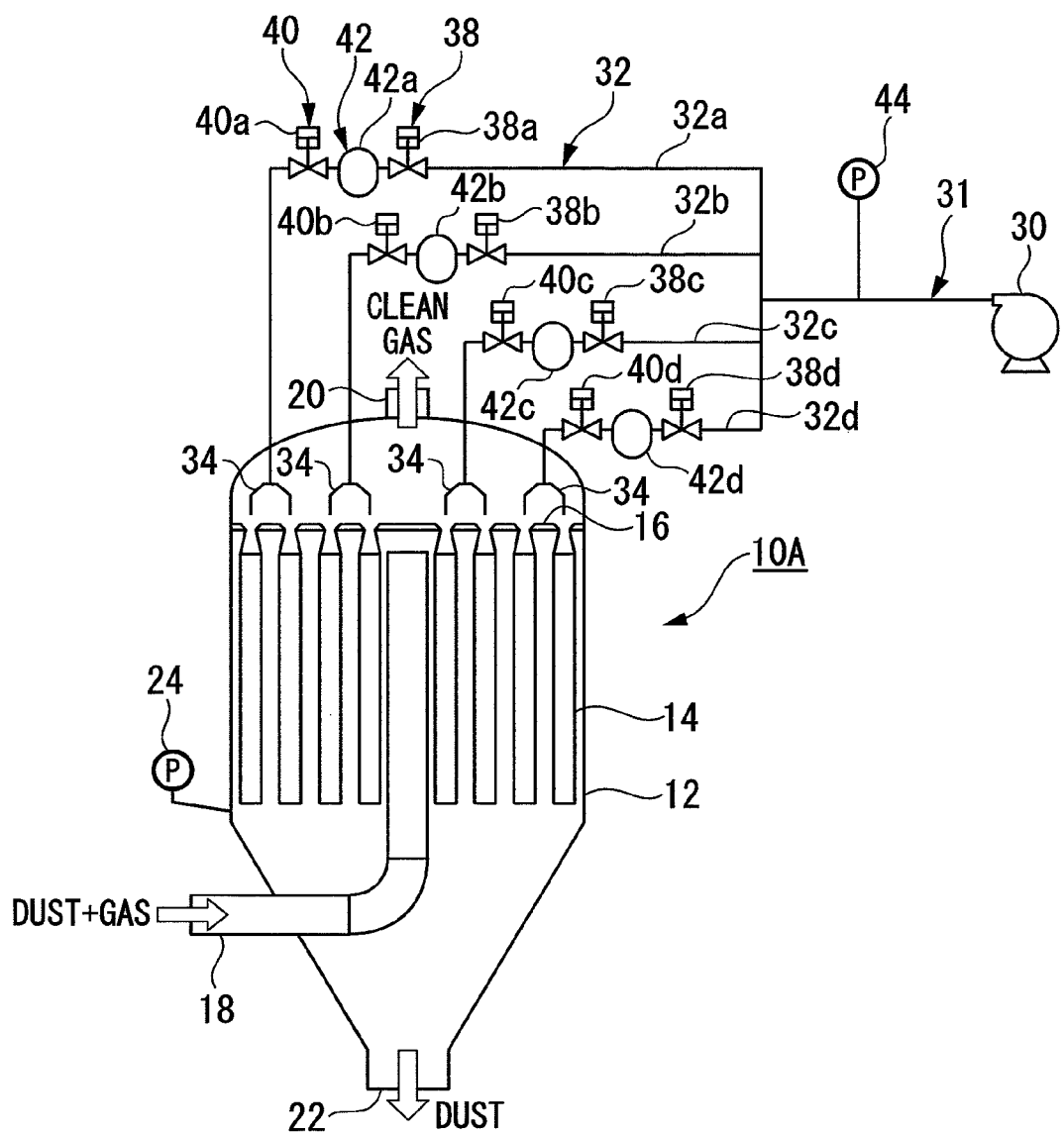
FIG. 1 is a system diagram showing the structure of a first embodiment of a dust-removing apparatus according to the present invention.

A porous filter (dust-removing apparatus) 10A of the embodiment shown in FIG. 1 is a candle-type porous filter system that removes dust from a dust-containing gas. This porous filter 10A includes a filter group composed of a large number of porous filter elements 14 installed in a vessel body 12. The dust-containing gas, which contains dust, is introduced into the vessel through a dust-containing-gas introduction pipe 18 disposed at the lower portion of the vessel body 12.

This dust-containing gas passes through the porous filter elements 14 in the vessel body 12 and flows out of the vessel from a clean gas outlet 20. During this process, the gas component of the dust-containing gas passes through the porous filter elements 14, whereas the dust, being composed of particles, is deposited and collected on filter surfaces. Reference sign 16 in the figure is a filter tube sheet supporting the large number of porous filter elements 14, and reference sign 22 is a dust discharge outlet from which the dust is discharged outside the vessel body 12.

The above porous filter 10A collects the dust through the filter group installed in the vessel body 12 onto the porous filter elements 14. To remove caked dust deposited and grown on the filter surfaces in the dust-containing gas, therefore, the porous filter 10A has a backwash system for releasing and removing the caked dust by means of a reverse gas flow.

This backwash system performs backwashing, that is, removes dust from the filter surfaces, by ejecting a high-pressure gas (backwash high-pressure medium), such as nitrogen gas, into the filter outlets toward the filter back surfaces of the porous filter elements 14 to form a high-pressure gas flow in the opposite direction to the dust-containing gas, thereby releasing caked dust deposited on the filter surfaces. This backwashing is executed by repeating supplying and stopping the high-pressure gas by means of the opening/closing operation of valves disposed in a backwash high-pressure-medium supply line.

The backwash system for the porous filter 10A includes, as a high-pressure-medium source, high-pressure-gas supply equipment 30, such as a compressor, for supplying a high-pressure gas to backwash nozzles 34. A backwash high-pressure-medium supply line through which the high-pressure gas is supplied from the high-pressure-gas supply equipment 30 to the backwash nozzles 34 includes, for example, a main backwash pipe 31 connected to the high-pressure-gas supply equipment 30 and four backwash pipes 32a, 32b, 32c, and 32d branched off from the main backwash pipe 31. The number of backwash pipes branched off is not limited to four, as shown; it may be changed depending on the number of separate cleaning areas, described later.

The backwash pipe 32a described above has a backwash tank 42a installed therein as a high-pressure-medium pressure accumulator tank having an upstream backwash valve 38a and a downstream backwash valve 40a. Likewise, the backwash pipe 32b has a backwash tank 42b having an upstream backwash valve 38b and a downstream backwash valve 40b installed therein, the backwash pipe 32c has a backwash tank 42c having an upstream backwash valve 38c and a downstream backwash valve 40c installed therein, and the backwash pipe 32d has a backwash tank 42d having an upstream backwash valve 38d and a downstream backwash valve 40d installed therein. That is, the backwash system of the present embodiment has a valve arrangement in which two backwash valves are installed, with a backwash tank disposed between the two backwash valves, for each backwash line.

In the following description, the backwash pipes 32a, 32b, 32c, and 32d, the upstream backwash valves 38a, 38b, 38c, and 38d, the downstream backwash valves 40a, 40b, 40c, and 40d, and the backwash tanks 42a, 42b, 42c, and 42d are collectively referred to as backwash pipes 32, upstream backwash valves 38, downstream backwash valves 40, and backwash tanks 42, respectively, unless the cleaning areas need to be distinguished.

In addition, a high-pressure-gas pressure gauge 44 for detecting the outlet pressure Pc of the high-pressure gas is installed in the main backwash pipe 31 near the outlet of the high-pressure-gas supply equipment 30 (the inlets of the upstream backwash valves).

Furthermore, a filter inlet pressure gauge 24 for measuring the inlet gas pressure Pf of the porous filter elements 14 is installed on the vessel body 12 or the dust-containing-gas introduction pipe 18.

As a result, the backwash high-pressure-medium supply line through which the backwash high-pressure gas to be ejected to the filter group of the porous filter elements 14 is guided from the high-pressure-gas supply equipment 30 to the backwash nozzles 34 in the cleaning areas passes through the main backwash pipe 31 and one of the backwash pipes 32a, 32b, 32c, and 32d, which form a high-pressure-medium passage, and the backwash tanks 42a, 42b, 42c, and 42d, which include the upstream backwash valves 38a, 38b, 38c, and 38d and the downstream backwash valves 40a, 40b, 40c, and 40d, respectively, are installed in the backwash pipes 32a, 32b, 32c, and 32d, respectively.

In the backwash system shown, for continuous operation within a process in which the porous filter 10A is installed, the filter group composed of the porous filter elements 14 installed in the vessel body 12 is divided into a plurality of (in the example shown, four) cleaning areas. The division into the cleaning areas reduces the amount of high-pressure gas required per backwash operation, thus making it easy to use low-speed-operated valves for the downstream backwash valves 40 together with low-capacity backwash tanks 42. In addition, the size of the high-pressure-gas supply equipment 30 can be reduced.

In addition, backwashing can be sequentially executed for each cleaning area by providing the four backwash pipes 32a, 32b, 32c, and 32d branched off from and independent of the main backwash pipe 31 for the respective groups of the cleaning areas and opening and closing the upstream backwash valves 38a, 38b, 38c, and 38d and the downstream backwash valves 40a, 40b, 40c, and 40d for the respective cleaning areas. That is, backwashing for each cleaning area is managed such that regular backwashing is executed for each group or for each set of several separate groups so that the flow rate of the high-pressure gas used for backwashing is reduced for less variation in the flow of the dust-containing gas through the vessel body 12 of the porous filter 10A.

The thus-configured backwash system sets the outlet pressure Pc of the high-pressure-gas supply equipment 30 detected by the high-pressure-gas pressure gauge 44 to the critical pressure or higher of the inlet gas pressure Pf detected by the filter inlet pressure gauge 24 so that the flow speed of the high-pressure gas ejected from the backwash nozzles 34 is the speed of sound or higher. Here, the high-pressure-gas pressure Pc is set such that the ratio (Pf/Pc) of the filter inlet gas pressure Pf to the high-pressure-gas pressure Pc is lower than or equal to a critical pressure ratio. With the inlet gas pressure Pf detected by the filter inlet pressure gauge 24, the flow speed of the high-pressure gas ejected from the backwash nozzles 34, which are located upstream thereof, can be more reliably set to the speed of sound or higher.

The critical pressure ratio is given by the following equation:

$$\text{critical pressure ratio} = Pf/Pc = [2/(\kappa+1)]^{\kappa/(\kappa-1)}$$

In this equation, κ is the specific heat ratio; if the high-pressure gas used is nitrogen, κ=1.4, and hence the critical pressure ratio is 0.5283.

That is, for the critical pressure ratio, the high-pressure-gas pressure Pc is 1/0.5283=1.89 times as high as the filter inlet gas pressure Pf.

The valve management of the backwash system described above, that is, the backwash opening/closing procedure of the upstream backwash valves 38 and the downstream backwash valves 40, includes a "backwash-preparing procedure," which is a valve operation before execution of backwashing, and a "backwash procedure," which is a valve operation during execution of backwashing.

The backwash-preparing procedure is composed of a high-pressure-medium charging procedure of closing the downstream backwash valves 40 and opening the upstream backwash valves 38 to charge the high-pressure gas into the backwash tanks 42 to a predetermined pressure, thereby raising the pressure therein, and a pressure-maintaining procedure of closing the upstream backwash valves 38 to maintain the pressure in the backwash tanks 42 at the predetermined pressure. That is, the backwash-preparing procedure is a preparatory procedure for entering a backwashable state by charging the high-pressure gas until the pressure in the backwash tanks 42 reaches the predetermined pressure, which is normally a pressure substantially equal to the outlet pressure Pc detected by the high-pressure-gas pressure gauge 44.

Next, the backwash procedure is a sequential valve opening/closing procedure composed of a backwash-executing procedure of opening the downstream backwash valves 40 for a predetermined period of time to supply the high-pressure gas from the backwash tanks 42 to the backwash nozzles 34, a high-pressure-medium recharging procedure of closing the downstream backwash valves 40 and opening the upstream backwash valves 38 to recharge the high-pressure gas into the backwash tanks 42 to a predetermined pressure, thereby raising the pressure therein, and a recharged-pressure maintaining procedure of closing the upstream backwash valves 38 to maintain the recharged pressure in the backwash tanks 42 at the predetermined pressure. This backwash procedure is sequentially carried out once completion of the backwash operation has been confirmed for each of the plurality of cleaning areas. That is, once completion of backwashing by ejecting the high-pressure gas from the backwash nozzles 34 has been confirmed for one cleaning area, the same backwash procedure is carried out for the next cleaning area; in this way, all cleaning areas are sequentially backwashed.

This backwash procedure is repeatedly carried out at an appropriate cycle time, with each set including sequentially backwashing all cleaning areas once or a predetermined number of times.

Therefore, upon completion of the backwash-preparing procedure, which charges the high-pressure gas into the backwash tanks 42 to a predetermined pressure (for example, the outlet pressure Pc), thereby raising the pressure therein, and which closes the upstream backwash valves 38 to maintain the pressure in the backwash tanks 42 at the predetermined pressure, the plurality of separate cleaning areas can be sequentially backwashed one after another by supplying the high-pressure gas from the backwash tanks 42 to the backwash nozzles 34.

In addition, upon completion of backwashing, the high-pressure gas can be recharged into the backwash tanks 42 to prepare for the next backwashing while another cleaning area is being backwashed. The backwash tanks 42 preferably have a capacity equivalent to the amount of high-pressure gas required for about one or two backwash operations.

The completion of the backwash operation for each cleaning area described above is determined based on the output of a sequence instruction to the upstream backwash valves 38 and the downstream backwash valves 40. That is, the determination is made by confirming the output of a control instruction to the valves, rather than based on whether the valve operation has been actually completed or not. Accordingly, for example, even if the valves malfunction and stop halfway, the completion of backwashing can be assumed by confirming the output of a control instruction.

Thus, even if a malfunction occurs in the valves, backwashing is sequentially continued in the next cleaning area without being stopped, so that a malfunction in one valve does not lead to the stop of the overall backwash system.

According to this embodiment, because the backwash tanks 42, serving as buffer tanks, are installed between the upstream backwash valves 38 and the downstream backwash valves 40 to store the high-pressure gas at a predetermined pressure, the backwash tanks 42 maintain the outlet pressure of the backwash nozzles 34 at a high pressure to produce a considerable backwashing effect without using high-speed-operated valves for the downstream backwash valves 40.

In addition, because the upstream backwash valves 38, located upstream of the backwash tanks 42, are closed during backwashing, in which the downstream backwash valves 40 are open, the amount of high-pressure gas flowing from the backwash nozzles 34 into the porous filter elements 14 in the cleaning areas does not exceed the capacity of the backwash tanks 42 even if the opening/closing operation of the downstream backwash valves 40 is slow. Furthermore, as the pressure of the backwash tanks 42 decreases over time, the flow rate of the high-pressure gas ejected from the backwash nozzles 34 decreases, so that the flow rate of the dust-containing gas flowing through the vessel body 12 shows less variation.

Figure 2:
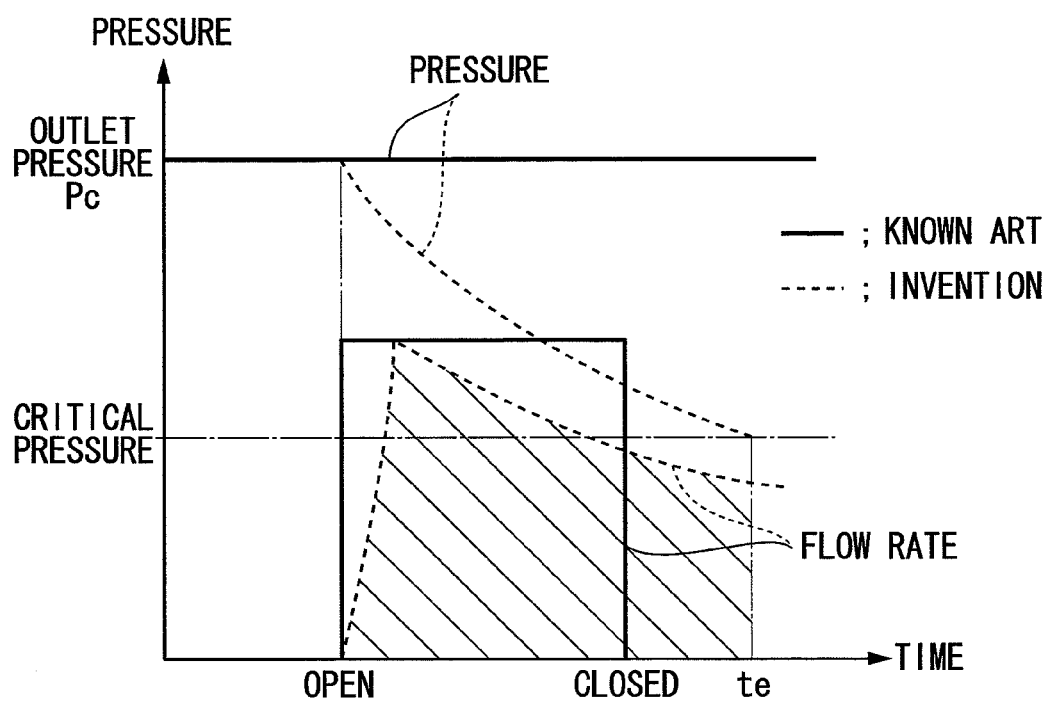
FIG. 2 is a graph showing changes in the pressure and flow rate of high-pressure gas with the opening and closing of backwash valves during backwashing in the known art and the present invention.
Figure 7:
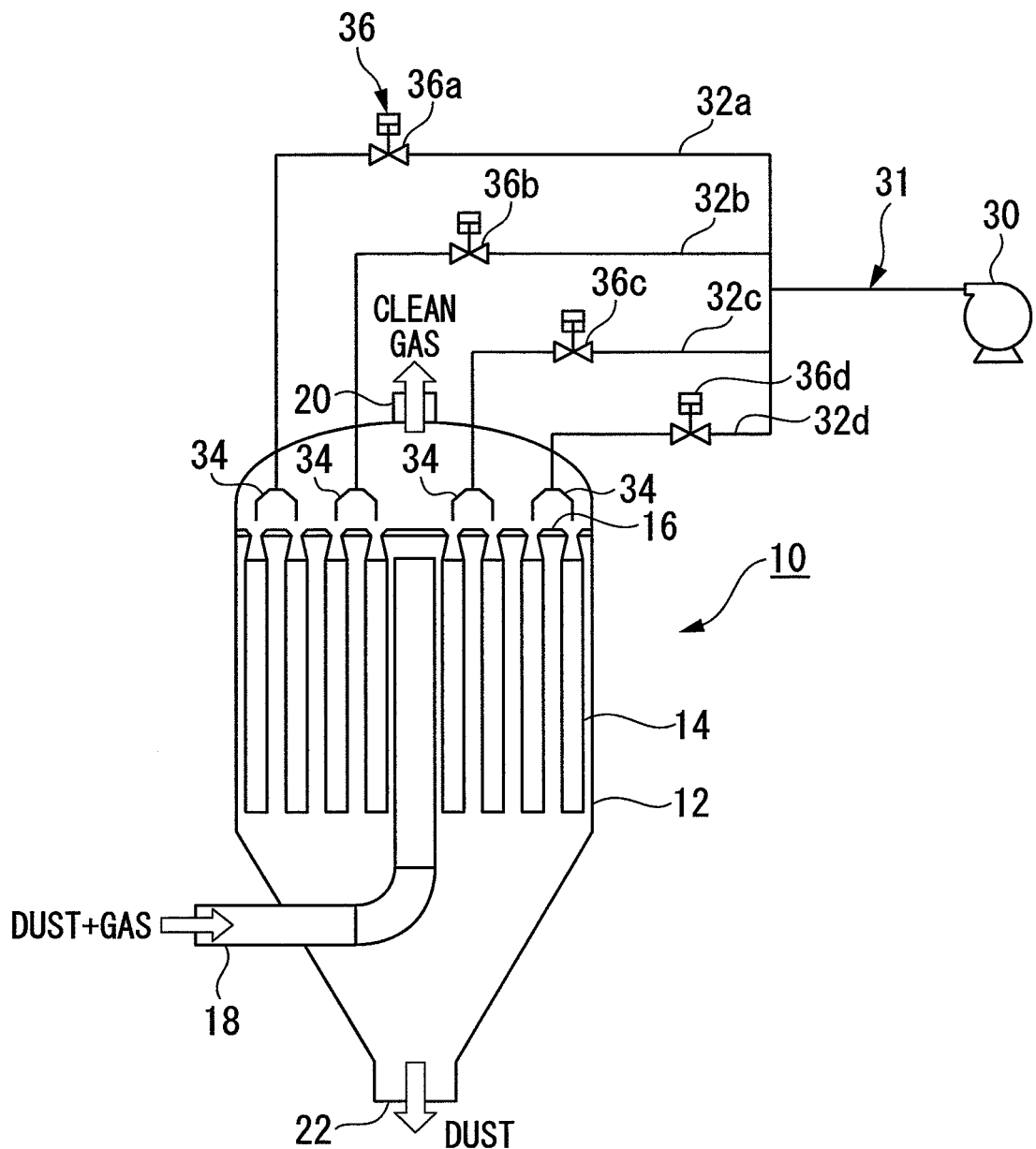
FIG. 7 is a system diagram showing the structure of a known example of a dust-removing apparatus.

FIG. 2 shows changes in the pressure and flow rate of the high-pressure gas with the opening/closing operation of the backwash valves during backwashing: the solid lines indicate changes in the known art (see FIG. 7), which uses high-speed-operated valves for the backwash valves 36, and the dashed lines indicate changes in the present invention (see FIG. 1), which uses low-speed-operated valves for the downstream backwash valves 40.

For the known art, the high-pressure gas is supplied at the outlet pressure Pc substantially at the same time as valve opening because high-speed-operated valves are used for the backwash valves 36 and, additionally, the high-pressure gas is constantly supplied from the high-pressure-gas supply equipment 30. Accordingly, the backwash nozzles 34 are supplied with the high-pressure gas at a flow rate corresponding to the outlet pressure Pc until valve closing. That is, the flow rate of the high-pressure gas rises to its maximum value instantaneously after the backwash valves 36 are opened, and the supply is continued in that state until valve closing. The amount of high-pressure gas supplied between the opening and closing of the backwash valves 36, that is, the amount of high-pressure gas used for one backwash operation, is equal to the area of the rectangular region enclosed by the solid line in the figure (rectangular region formed by the line indicating the change in flow rate).

For the present invention, on the other hand, the downstream backwash valves 40, which are low-speed valves, are opened with the high-pressure gas charged into the backwash tanks 42 to substantially the same pressure as the outlet pressure Pc. Accordingly, the flow rate of the high-pressure gas reaches the maximum flow rate with a time delay from valve opening. The pressure in the backwash tanks 42, on the other hand, decreases gradually as the high-pressure gas flows out after valve opening, so that the flow rate decreases over time.

Here, to eject the high-pressure gas from the backwash nozzles 34 at the speed of sound or higher, the pressure in the backwash tanks 42 needs to be higher than or equal to the critical pressure relative to the filter inlet gas pressure; therefore, the period of time effective for backwashing is from the time of valve opening to the time te. Hence, because the amount of high-pressure gas supplied during this period of time is equal to the area of the hatched region in the figure, to set the amount of high-pressure gas accumulated in the backwash tanks 42 to, for example, the amount equivalent to one backwash operation, the area of the hatched region may be larger than or equal to the area of the rectangle described above.

Second Embodiment

Figure 3:
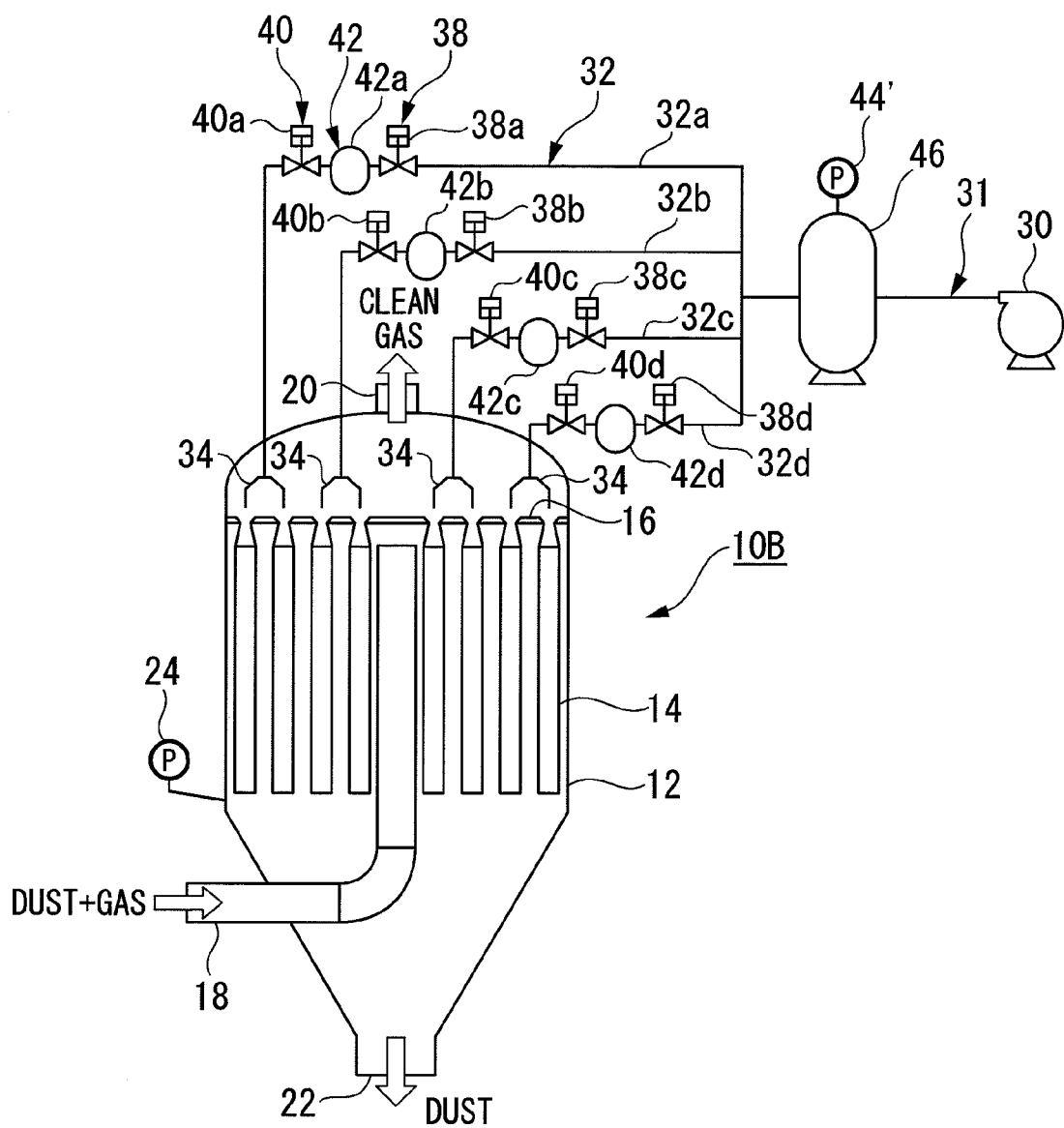
FIG. 3 is a system diagram showing the structure of a second embodiment of a dust-removing apparatus according to the present invention.

Next, a second embodiment of a dust-removing apparatus according to the present invention will be described based on FIG. 3. The same parts as those in the embodiment described above are denoted by the same reference signs, and a detailed description thereof is omitted.

In this embodiment, a high-pressure-gas tank 46 serving as a high-pressure-gas storage tank is installed at the outlet of high-pressure-gas supply equipment 30 for supplying a high-pressure gas to a backwash system for a porous filter 10B. In addition, while the high-pressure-gas pressure gauge 44 for detecting the outlet pressure Pc of the high-pressure gas is installed near the outlet of the high-pressure-gas supply equipment 30 in the embodiment described above, a high-pressure-gas pressure gauge 44' is directly attached to the high-pressure-gas tank 46 in this embodiment, where the pressure detected by the high-pressure-gas pressure gauge 44' is used as the outlet pressure Pc of the high-pressure gas to execute the same control as in the embodiment described above.

With this configuration, in which the high-pressure-gas tank 46 for storing the high-pressure gas at a predetermined pressure is installed at the outlet of the high-pressure-gas supply equipment 30, the pressure shows less variation on the side from which the high-pressure gas is supplied than in the case where the high-pressure gas is directly supplied, thus stabilizing the charged pressure in the backwash tanks 42. This results in more efficient and reliable backwashing, thus achieving greater effectiveness in releasing and removing caked dust from the filter surfaces of the porous filter elements 14. In addition, the use of the inner pressure of the high-pressure-gas tank 46 as the outlet pressure Pc enables more stable control.

While the high-pressure-gas supply equipment 30 starts or stops operating, or supplies or stops supplying the high-pressure gas, depending on the outlet pressure Pc of the high-pressure gas, the high-pressure-gas tank 46, which stores the high-pressure gas at the outlet pressure Pc, alleviates the pressure variation of the high-pressure gas supplied to the backwash tanks 42. This reduces the pressure variation of the high-pressure gas supplied to the backwash tanks 42 and stabilizes the pressure of the high-pressure gas charged into the backwash tanks 42, thus reducing the number of times the high-pressure-gas supply equipment 30 is started and stopped, which improves the durability and reliability of the equipment.

Third Embodiment

Figure 4:
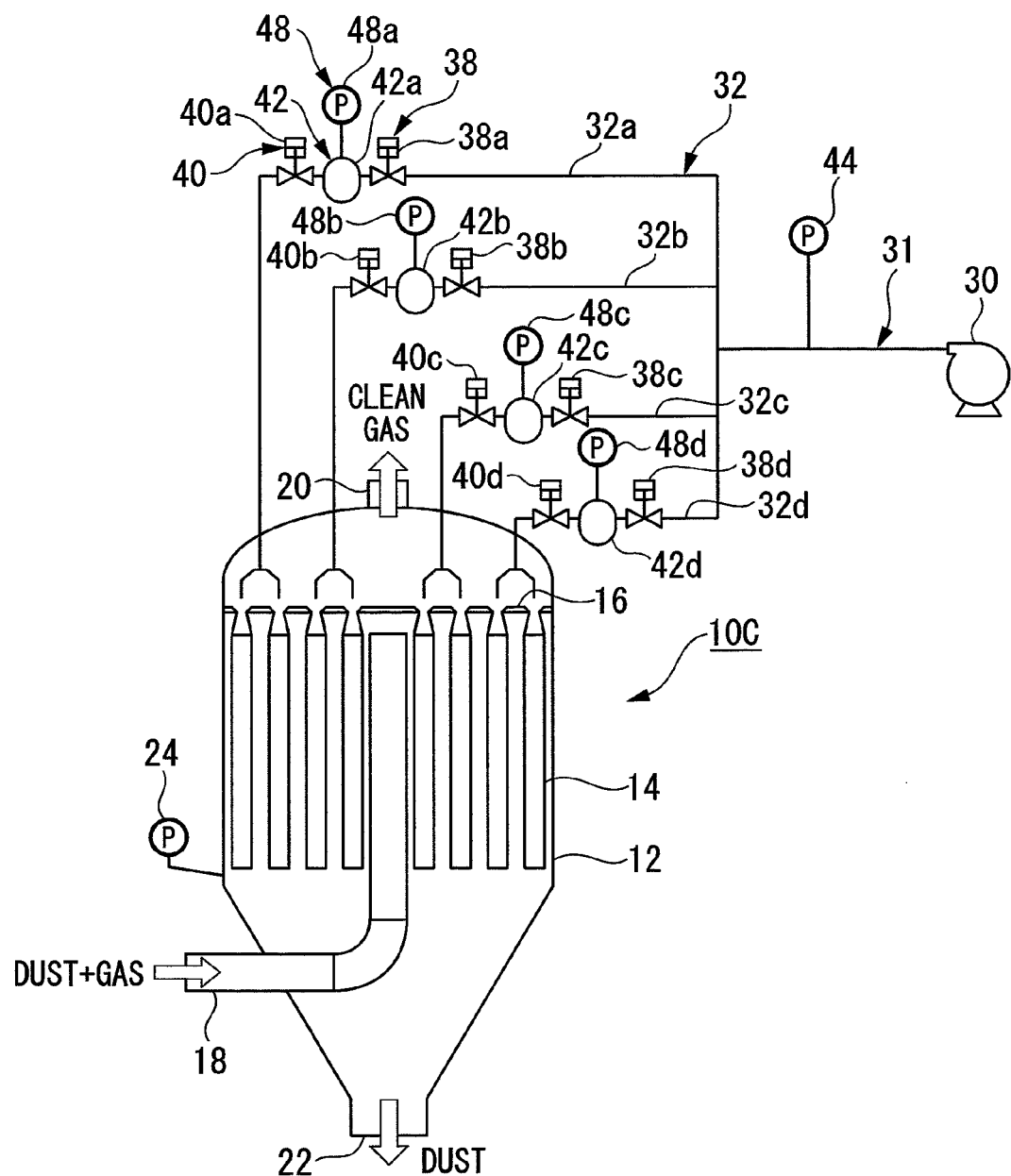
FIG. 4 is a system diagram showing the structure of a third embodiment of a dust-removing apparatus according to the present invention.

Next, a third embodiment of a dust-removing apparatus according to the present invention will be described based on FIG. 4. The same parts as those in the embodiments described above are denoted by the same reference signs, and a detailed description thereof is omitted.

In this embodiment, a backwash system for a porous filter 10C has backwash tank pressure gauges 48 installed on the backwash tanks 42 to detect backwash tank inner pressure Pt. The backwash tank pressure gauges 48a, 48b, 48c, and 48d are installed on the backwash tanks 42*a*, 42*b*, 42*c*, and 42*d*, respectively; they are simply referred to as the backwash tank pressure gauges 48 unless each line needs to be distinguished.

Thus, because in this embodiment the backwash tank pressure gauges 48 are installed on the backwash tanks 42 in addition to the configuration described in the first embodiment discussed above, the timing at which the upstream backwash valves 38 and the downstream backwash valves 40 are closed can be set using the backwash tank inner pressure Pt, which is detected at a position closer to the backwash nozzles 34, rather than using the outlet pressure Pc of the high-pressure-gas supply equipment 30 detected by the high-pressure-gas pressure gauge 44.

The timing at which the upstream backwash valves 38 are closed is set such that it comes after the backwash tank inner pressure Pt reaches "1/critical pressure ratio" or more times the inlet gas pressure Pf detected by the filter inlet pressure gauge 24, preferably 1.15 times or more the pressure for the critical pressure ratio.

The timing at which the downstream backwash valves 40 are closed is set such that it comes when the backwash tank inner pressure Pt decreases to less than "1/critical pressure ratio" times the inlet gas pressure Pf or, at the latest, to 0.9 times or less the pressure for the critical pressure ratio.

Thus, because the backwash tank pressure gauges 48 are installed on the backwash tanks 42, the pressure of the high-pressure gas can be set to a value appropriate for backwashing, thus allowing caked dust to be more effectively release and removed from the filter surfaces of the porous filter elements 14 by backwashing.

In addition, because the downstream backwash valves 40 can be controlled such that they are closed when detecting that the pressure of the backwash tanks 42 decreases to a low pressure that does not provide a sufficient backwashing effect, the flow rate (consumption) of the backwash high-pressure gas can be reduced by preventing excess high-pressure gas from flowing out.

That is, because the timing at which the upstream backwash valves 38 are closed in the pressure-maintaining procedure described above and the timing at which the downstream backwash valves 40 are closed in the high-pressure-medium recharging procedure are determined based on the backwash tank inner pressure Pt, the pressure of the backwash tanks 42 can be easily set to a pressure best suited to backwashing.

Fourth Embodiment

Figure 5:
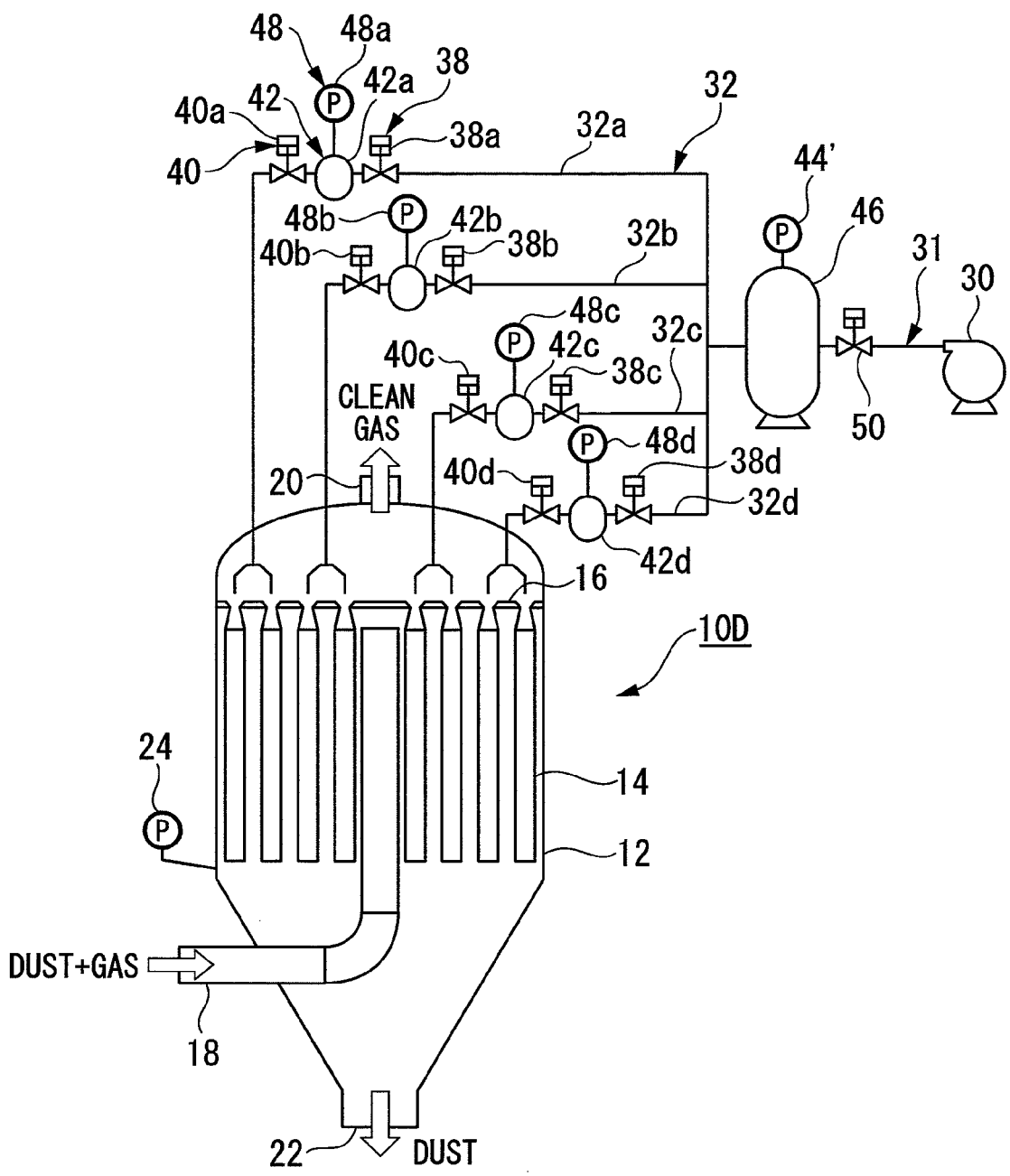
FIG. 5 is a system diagram showing the structure of a fourth embodiment of a dust-removing apparatus according to the present invention.

Next, a fourth embodiment of a dust-removing apparatus according to the present invention will be described based on FIG. 5. The same parts as those in the embodiments described above are denoted by the same reference signs, and a detailed description thereof is omitted.

In this embodiment, a backwash system for a porous filter 10D has a high-pressure-gas tank 46 installed at the outlet of the high-pressure-gas supply equipment 30 and a control valve 50 installed upstream of the high-pressure-gas tank 46. A high-pressure-gas pressure gauge 44' is attached to the high-pressure-gas tank 46, and the remaining structure is the same as that of the third embodiment described above.

In this embodiment, in addition to the third embodiment, the pressure detected by the high-pressure-gas pressure gauge 44' is used when executing the pressure control of the high-pressure gas.

That is, because the backwash tank pressure gauges 48 are installed on the backwash tanks 42, the pressure of the high-pressure gas can be set to a value appropriate for backwashing, thus allowing caked dust to be more effectively released and removed from the filter surfaces of the porous filter elements 14 by backwashing.

In addition, because the downstream backwash valves 40 are closed when detecting that the pressure of the backwash tanks 42 decreases to a low pressure that does not provide a sufficient backwashing effect, the flow rate of the backwash high-pressure gas can be reduced.

While the high-pressure-gas supply equipment 30 starts or stops operating, or supplies or stops the high-pressure gas, depending on the outlet pressure Pc of the high-pressure gas, the high-pressure-gas tank 46 and the control valve 50 alleviate the pressure variation on the supply side. This reduces the number of times the high-pressure-gas supply equipment 30 is started and stopped, which improves the reliability of the equipment.

Accordingly, even if the backwash system operates with high frequency, the backwash tank inner pressure Pt can be maintained at an appropriate pressure by the gas reservoir effect of the high-pressure-gas tank 46. In addition, the pressure in the high-pressure-gas tank 46 can be more reliably maintained at a predetermined level by operating the control valve 50 based on the outlet pressure Pc detected by the high-pressure-gas pressure gauge 44'.

Fifth Embodiment

Figure 6:
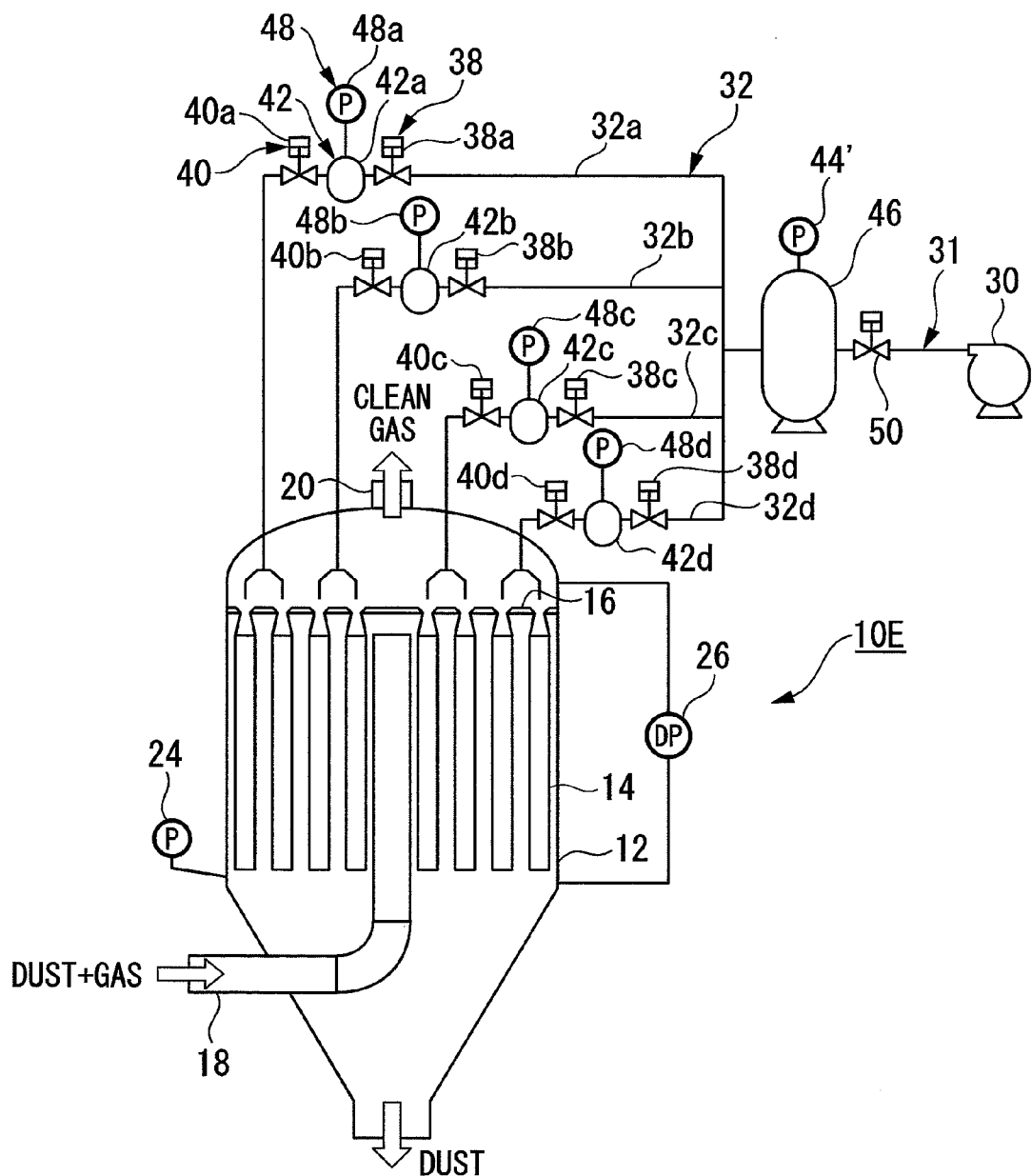
FIG. 6 is a system diagram showing the structure of a fifth embodiment of a dust-removing apparatus according to the present invention.

Next, a fifth embodiment of a dust-removing apparatus according to the present invention will be described based on FIG. 6. The same parts as those in the embodiments described above are denoted by the same reference signs, and a detailed description thereof is omitted.

In this embodiment, a porous filter 10E is shown in which, in addition to the fourth embodiment described above, a differential pressure gauge 26 for detecting the filter differential pressure DP of the filter group of the porous filter elements 14 is installed on the vessel body 12. That is, the porous filter 10E is configured to execute the pressure control of the high-pressure gas by detecting the differential pressure DP between the inlet and outlet sides of the porous filter elements 14 with the differential pressure gauge 26.

The specific pressure control is as follows: the instruction for pressure control of the high-pressure gas is appropriately changed based on changes in the resistance coefficient of the porous filter elements 14 calculated from the filter differential pressure DP so that the pressure of the high-pressure gas detected by the high-pressure-gas pressure gauge 44' is at an appropriate level (for example, 5 kPa or less). That is, the filter differential pressure DP, which indicates the amount of caked dust deposited on the porous filter elements 14, can be reflected in optimizing the pressure of the high-pressure gas used for backwashing.

Accordingly, if the instruction for pressure control of the high-pressure gas reaches the upper limit of the high-pressure-gas supply equipment 30, the control instruction can be changed so as to shorten the period (cycle time) of the backwash system. That is, the filter differential pressure DP can be maintained within an appropriate range by appropriately changing the backwash high-pressure-gas pressure and the cycle time depending on changes in filter differential pressure DP, thus flexibly supporting various operations of the porous filter 10E.

Thus, in the porous filters of the embodiments described above, the backwash tanks 42, serving as buffer tanks, are installed to allow the use of low-speed-operated valves for the downstream backwash valves 40 and the upstream backwash valves 38 required for the backwash operation. The use of low-speed-operated downstream backwash valves 40 and upstream backwash valves 38 for the backwash operation improves the operating conditions of the backwash valves, including a reduced number of operations, thus improving the durability of the backwash valves and consequently improving the durability and operating reliability of the porous filters.

Furthermore, in the event of a malfunction in the backwash valves, the amount of backwash high-pressure gas supplied to the filter group of the porous filter is limited by the capacity of the backwash tanks 42 because the upstream backwash valves 38 of the backwash tanks 42 are closed. In the porous filters, therefore, the flow rate of the backwash high-pressure gas, which contributes to a disturbance in the flow of the dust-containing gas, is reduced, which allows dust removal to be continued with a less-varying, more-stable flow of the dust-containing gas. This improves the operating stability of the porous filters of the embodiments described above and therefore the operating stability of plants equipped with these porous filters, including integrated gasification combined cycle facilities and pressurized fluidized-bed combustion combined cycle facilities.

The present invention can also be applied to apparatuses that repeat a backwash operation, in which a high-pressure medium is supplied and stopped, with high frequency and that control the procedure with valves.

The present invention is not limited to the embodiments described above; it can be appropriately changed without departing from the spirit thereof.

The invention claimed is:

1. A method of removing dust collected from a gas passing through a filter group installed in a vessel body, the dust being removed from filter surfaces by backwashing in which an ejecting operation and a non-ejecting operation of a backwash high-pressure medium from a backwash nozzle toward the filter group are repeated, the method comprising:
   providing a dust-removing apparatus comprising:
   a high-pressure-medium source;
   a high-pressure-medium passage;
   a high-pressure-medium pressure accumulator tank disposed in the high-pressure-medium passage, the high-pressure-medium passage configured to enable the backwash high-pressure medium to be guided from the high-pressure-medium source to the backwash nozzle;
   an upstream open-close valve disposed in the high-pressure-medium passage between the high-pressure-medium pressure accumulator tank and the high-pressure-medium source;
   a downstream open-close valve disposed in the high-pressure-medium passage between the high-pressure-medium pressure accumulator tank and the backwash nozzle;
   an accumulator tank pressure gauge for detecting an accumulated pressure Pt in the high-pressure-medium pressure accumulator tank; and
   a filter inlet pressure gauge for detecting a filter inlet gas pressure Pf of the gas at the inlet of the filters,
   the method further comprising:
   opening the downstream open-close valve to perform the ejecting operation based on a control instruction signal in order to eject the high-pressure-medium stored in the high-pressure-medium pressure accumulator tank; and
   closing the downstream open-close valve to perform the non-ejecting operation based on a control instruction signal,
   wherein the downstream open-close valve is closed to perform the non-ejecting operation based on said control instruction signal generated before the accumulated pressure Pt becomes equal to or less than nine tenths of "1/critical pressure ratio" times the filter inlet gas pressure Pf.

2. The method of removing dust according to claim 1, further comprising providing a high-pressure-medium storage tank disposed at an outlet of the high-pressure-medium source.

3. The method of removing dust according to claim 1, wherein a backwash high-pressure-medium supply line comprises the high-pressure-medium passage, the high-pressure-medium pressure accumulator tank, the upstream open-close valve, and the downstream open-close valve,
   wherein the backwash high-pressure-medium supply line branches into a plurality of high-pressure-medium branch supply lines downstream of the high-pressure-medium source, and each of the high-pressure-medium branch supply lines has the high-pressure-medium pressure accumulator tank, the downstream open-close valve, and the backwash nozzle, the high-pressure-medium branch supply lines being assigned to a plurality of cleaning areas into which the filter group is divided.

4. The method of removing dust according to claim 3, further comprising:
   backwash opening/closing of the upstream and downstream open-close valves including
   a backwash-preparing comprising:
   closing the downstream open-close valve and opening the upstream open-close valve to charge the backwash high-pressure medium into the high-pressure-medium pressure accumulator tank to a predetermined pressure, thereby raising the pressure therein; and
   closing the upstream open-close valve to maintain the pressure in the high-pressure-medium pressure accumulator tank at the predetermined pressure, and
   a sequential backwashing operation comprising:
   opening the downstream open-close valve for a predetermined period of time to supply the backwash high-pressure medium from the high-pressure-medium pressure accumulator tank to the backwash nozzle;
   closing the downstream open-close valve and opening the upstream open-close valve to recharge the backwash high-pressure medium into the high-pressure-medium pressure accumulator tank to the predetermined pressure, thereby raising the pressure therein; and
   closing the upstream open-close valve to maintain the recharged pressure in the high-pressure-medium pressure accumulator tank at the predetermined pressure,
   the backwashing being sequentially carried out once completion of the backwash opening/closing has been confirmed for each of the plurality of cleaning areas.

5. The method of removing dust according to claim 4, wherein the completion of the backwash opening/closing for each of the cleaning areas is determined based on the output of a sequence instruction to the upstream and downstream open-close valves.

6. The method of removing dust according to claim 1, wherein the high-pressure medium source is a compressor.

7. The method of removing dust according to claim 2, wherein the high-pressure medium source is a compressor.

\* \* \* \* \*